2,848,461
ORANGE PIGMENT

Roy A. Pizzarello, Mount Vernon, N. Y., and Alfred F. Schneid, New Milford, N. J., assignors to Interchemical Corporation, New York, N. Y., a corporation of Ohio No Drawing. Application December 8, 1955
Serial No. 551,747

4 Claims. (Cl. 260—368)

This invention relates to a novel orange pigment characterized by unusual fastness to light (over 200 hours in a standard "Fadeometer" test) combined with resistance to dry cleaning solvents.

The use of pigments in coloring textiles is historically, very old—but such use was of little commercial importance, outside of specialty applications, until pigmented water-in-lacquer emulsion printing pastes were introduced, in about 1938. Since then, the use of pigments for coloring textiles has expanded considerably—and the popularization of "dope dyeing" of synthetics—i. e. incorporation of color into a spinning solution has increased the demand for satisfactory pigments.

The principal criteria for pigments for textiles coloring are (1) brightness of shade (2) resistance to fading by sun, etc. (3) resistance to soap and (4) resistance to dry cleaning solvents, such as perchloroethylene. In the case of the yellow, orange and red pigments, it has been found necessary to compromise on fade resistance in order to get the other desirable properties. In the orange field, pyrazalone azo pigments have been found to be the most acceptable colors of those generally available; but even the best of them lack really good light fastness. Consequently, investigators have been actively looking for superior orange pigments for at least 15 years.

We have discovered an orange pigment which is characterized by a bright yellowish orange shade, by unusual resistance to fading (200 plus hours in a "Fadeometer," contrasted with about 100 hours for the best pyrazalone azo type oranges), by resistance to soap and by resistance to all dry cleaning solvents—in short, by its superior properties for use in textile coloring. This pigment is the reaction product of symmetrical o-phthalyl dichloride with 1-amino-4-methoxy anthraquinone in substantially pure form and has the structural formula:

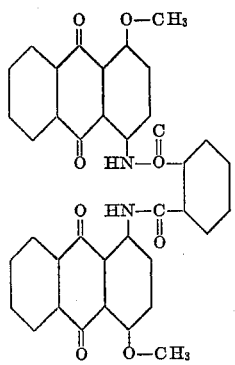

It is extremely important that the reaction be carried out between symmetrical o-phthalyl chloride and 1-amino anthraquinone, under such conditions that HCl fumes are removed from the reaction mixture or the desired pigment will not be obtained. Preferably the HCl fumes are removed by blowing dry air or an inert gas such as $CO_2$, or $N_2$ through the reaction mixture.

The reaction may be carried out in any inert solvent for the reactants, which boils at a high enough temperature to permit the reaction to proceed. We have used various chlorobenzenes (dichlorobenzenes, trichlorobenzene, etc.) perchloroethylene, nitrobenzene etc. It should be noted that because of differences in solvent power, the shade of pigment produced varies from solvent to solvent. Because of this, our preferred solvent is nitrobenzene.

Reaction temperature is likewise of importance. For instance, with nitrobenzene color strength is lost as the condensation temperature is taken up above about 110° C. While small temperature increments produce only small changes, we prefer to insure maximum brightness of shade by holding the temperature to 110° C. or lower.

The products should be used in approximately theoretical ratios—2 moles of the 1-amino-4-methoxy-anthraquinone to 1 mol of the symmetrical phthalyl chloride.

In preparing the pigment, we charge, into a convenient closed reaction vessel provided with a stirrer, 360 parts by weight of nitrobenzene, 27.6 parts by weight of 1-amino-4-methoxy-anthraquinone and obtain solution by heating to 90° C. with stirring. We then cool to 50° C. and add, 14 parts symmetrical o-phthalyl dichloride and heat to 90–100° C. over a period of about 3 hours, using indirect heat (e. g.—electric heat, oil bath, steam jacket). Air is blown through the batch to remove the HCl as it is formed. After cooling the mixture to 50° C., we filter to separate the precipitated pigment. The pigment is washed on the filted until the washings are colorless and then dried at 70° C. Yield is 18.7 parts of an orange colored product which, when dispersed in cellulose acetate gives a bright orange color.

Care must be taken with the raw materials, and the processing equipment, as well as with the reaction conditions, in order to get a substantially pure end product. Thus, if the phthalyl chloride is made from phthalic anhydride and phosphorus pentachloride, or from phthalic anhydride and sulfonyl chloride, the phthalyl chloride must be carefully purified—relatively small quantities of phosphorus anhydride will cause the final product to be dirty, and unsatisfactory as a pigment. Furthermore, it is essential to produce the desired pigment immediately—the product is so very insoluble in the available solvents that there is no satisfactory way to convert the dirty product to a satisfactory clean pigment.

Our new pigment is satisfactory for both pigment printing and pigment dyeing of textiles with synthetic resin binders, and can be incorporated into cellulose acetate and viscose spinning solutions. It is also useful for nitrocellulose lacquers for automobiles, and has sufficient resistance for outdoor sign finishes.

We claim:

1. A new pigment which imparts a bright orange color when dispersed in cellulose acetate and consists of the condensation product of one mol of symmetrical ortho phthalyl dichloride and two mols of 1-amino-4-methoxy-anthraquinone, said condensation being carried out in an inert solvent at a temperature not in excess of 110° C., while blowing the reaction mixture with an inert gas to remove the HCl fumes.

2. The method of preparing a pigment which comprises condensing, in an inert solvent for the reactants, one mol of symmetrical ortho phthalyl dichloride with two mols of 1-amino-4-methoxy-anthraquinone at a temperature not in excess of 110° C., while blowing the reaction mixture with an inert gas to remove the HCl fumes as they are formed.

3. The method of claim 2 in which the inert solvent is nitrobenzene.

4. A new pigment which imparts a bright orange color when dispersed in cellulose acetate and consists of the condensation product of one mole of symmetrical ortho phthalyl dichloride and two mols of 1-amino-4-methoxy anthraquinone, said condensation being carried out in nitrobenzene at a temperature not in excess of 110° C., while blowing the reaction mixture with an inert gas to remove the HCl fumes.

References Cited in the file of this patent

UNITED STATES PATENTS

| | | |
|---|---|---|
| 938,565 | Fischer | Nov. 2, 1909 |
| 2,299,141 | Hauser et al. | Oct. 20, 1942 |